(12) United States Patent
Dainty et al.

(10) Patent No.: US 10,152,631 B2
(45) Date of Patent: Dec. 11, 2018

(54) OPTICAL SYSTEM FOR AN IMAGE ACQUISITION DEVICE

(71) Applicant: FotoNation Limited, Galway (IE)

(72) Inventors: Christopher Dainty, Galway (IE); Alexander Goncharov, Galway (IE); Istvan Andorko, Galway (IE); Peter Corcoran, Galway (IE); Petronel Bigioi, Galway (IE)

(73) Assignee: FotoNation Limited, Galway (IE)

( * ) Notice: Subject to any disclaimer, the term of this patent is extended or adjusted under 35 U.S.C. 154(b) by 18 days.

(21) Appl. No.: 14/962,909

(22) Filed: Dec. 8, 2015

(65) Prior Publication Data

US 2016/0092731 A1    Mar. 31, 2016

Related U.S. Application Data

(63) Continuation-in-part of application No. 14/821,156, filed on Aug. 7, 2015, now Pat. No. 10,051,208.

(Continued)

(51) Int. Cl.
| | |
|---|---|
| *G06K 9/00* | (2006.01) |
| *G02B 13/00* | (2006.01) |
| *H04N 5/33* | (2006.01) |
| *G02B 13/14* | (2006.01) |
| *G02B 5/00* | (2006.01) |

(Continued)

(52) U.S. Cl.
CPC ......... *G06K 9/00604* (2013.01); *G02B 5/005* (2013.01); *G02B 5/208* (2013.01); *G02B 13/004* (2013.01); *G02B 13/008* (2013.01); *G02B 13/146* (2013.01); *G06K 9/00617* (2013.01);

(Continued)

(58) Field of Classification Search
CPC ........... G06K 9/00604; G06K 9/00617; G06K 9/00248; G06K 9/209; H04N 5/332; H04N 9/07; G02B 5/005; G02B 5/208; G02B 13/004; G02B 13/008; G02B 13/146
See application file for complete search history.

(56) References Cited

U.S. PATENT DOCUMENTS

| | | |
|---|---|---|
| 6,870,690 B1 | 3/2005 | Lawson et al. |
| 7,881,603 B2 | 2/2011 | Gere |
| | (Continued) | |

OTHER PUBLICATIONS

A. K. Jain, A. Ross, and S. Prabhaka, "An introduction to biometric recognition," IEEE Trans. Circuits Syst. Video Technol., vol. 14, 2004.

(Continued)

*Primary Examiner* — Luong T Nguyen

(57) ABSTRACT

An optical system for an image acquisition device comprises a filter comprising a central aperture arranged to transmit both visible and selected near infra-red (NIR) wavelengths and a peripheral aperture arranged to block visible wavelengths and to transmit the NIR wavelengths. An image sensor comprises an array of pixels including pixels sensitive to visible wavelengths and corresponding pixels sensitive to the NIR wavelengths. A lens assembly is axially located between the filter and the image sensor and comprises a plurality of lens elements. The lens elements are arranged to simultaneously focus NIR light received from a given object through central and peripheral apertures of the filter and visible light received from the object through the central aperture onto the sensor surface.

25 Claims, 7 Drawing Sheets

Related U.S. Application Data

(60) Provisional application No. 62/126,270, filed on Feb. 27, 2015, provisional application No. 62/035,272, filed on Aug. 8, 2014.

(51) Int. Cl.
  *G02B 5/20* (2006.01)
  *G06K 9/20* (2006.01)
  *H04N 9/07* (2006.01)

(52) U.S. Cl.
  CPC ............ *G06K 9/209* (2013.01); *H04N 5/332* (2013.01); *H04N 9/07* (2013.01)

(56) References Cited

U.S. PATENT DOCUMENTS

| | | |
|---|---|---|
| 8,059,344 B2 | 11/2011 | Wood et al. |
| 8,294,808 B2 | 10/2012 | Caron |
| 9,535,238 B2 * | 1/2017 | Suzuki .................. G02B 13/18 |
| 2010/0000668 A1 | 1/2010 | Wu et al. |
| 2010/0066854 A1 | 3/2010 | Mather et al. |
| 2011/0205651 A1 | 8/2011 | Yamano et al. |
| 2012/0024285 A1 | 2/2012 | Dashawetz et al. |
| 2012/0242857 A1 | 9/2012 | Mather et al. |
| 2013/0033579 A1 | 2/2013 | Wajs |
| 2013/0113988 A1 | 5/2013 | Wajs |
| 2015/0227790 A1 * | 8/2015 | Smits .................. G06K 9/00604 348/78 |
| 2015/0245767 A1 * | 9/2015 | Northcott ............ A61B 3/1216 351/206 |
| 2016/0019420 A1 * | 1/2016 | Feng .................. G06K 9/00604 382/117 |

OTHER PUBLICATIONS

J. R. Matey, O. Naroditsky, K. Hanna, R. Kolczynski, D. J. Lolacono, S. Mangru, M. Tilnker, T. M. Zappia, and W. Y. Zhao, "Iris on the Move: Acquisition of Images for Iris Recognition in Less Constrained Environments," Proc. IEEE, vol. 94, 2006.

Daugman J. "How Iris Recognition Works", IEEE Transactions on Circuits and Systems for Video Technology, vol. 14, 2004, pp. 21-30.

\* cited by examiner

|  | Visible | NIR |
|---|---|---|
| Wavelength range | 0.51-0.61 μm | 0.8-0.9 μm |
| Field of view (total) | 60 deg | 20 deg |
| Focal length | 4.640mm | 4.648 mm |
| Entrance pupil diameter | 1.7 mm | 2.72 mm |
| Object-pupil distance | 200 mm | infinity | 200 mm |
| IR filter-sensor distance | 0.8 mm | 0.6837 mm | 0.8 mm |

Figure 3

| S# | Surface Type | Radius (mm) | Thickness (mm) | Ref Index, Dispersion | Diameter (mm) | Comment |
|---|---|---|---|---|---|---|
|  | Object | ∞ | 200 | air |  |  |
| 1 | Standard | ∞ | 0.15 | N-BK7 | 196/65 | Window (front) |
| 2 | Standard | ∞ | 0 | air | 1.71/2.73 | Aperture 102 (filter) |
| 3 | Standard | 1.9 | 0.7 | 1.5441, 56.1143 | 1.7/2.72 | Lens 104-1 front |
| 4 | Even Asphere | 12.35 | 0.1 | air | 2.922 | Lens 104-1 (back) |
| 5 | Even Asphere | -29.748 | 0.4 | 1.6336, 23.667 | 2.903 | Lens 104-2 (front) |
| 6 | Even Asphere | 2.87 | 0.425 | air | 2.896 | Lens 104-2 (back) |
| 7 | Even Asphere | 1.77105 | 1.075 | 1.5441, 56.1143 | 2.705 | Lens 104-3 (front) |
| 8 | Even Asphere | 11.154 | 0.8 | air | 2.769 | Lens 104-3 (back) |
| 9 | Even Asphere | 6.031 | 0.4261 | 1.5441, 56.1143 | 2.450 | Lens 104-4 (front) |
| 10 | Even Asphere | 1.848 | 0.5 | air | 2.465 | Lens 104-4 (back) |
| 11 | Standard | ∞ | 0.11 | N-BK7 | 3.48 | IR filter 108 (front) |
| 12 | Standard | ∞ | 0.8 | air | 4.37 | IR filter 108 (back) |
| 13 | Image plane | ∞ |  |  | 4.46 | Sensor |
|  |  |  |  |  | 5.2 |  |

Figure 4

| S# | $A_1$ on $h^4$ | $A_2$ on $h^6$ | $A_3$ on $h^8$ | $A_4$ on $h^{10}$ | $A_5$ on $h^{12}$ | $A_6$ on $h^{14}$ | $A_7$ on $h^{16}$ |
|---|---|---|---|---|---|---|---|
| 4 | -0.0070892853 | 0.0083009465 | -0.0023398538 | -0.0053349604 | 0.0010308612 | 0.00013062301 | $3.6266535*10^{-5}$ |
| 5 | -0.036527933 | 0.023812006 | -0.0034030287 | -0.0028145112 | 0.00029187568 | 0.00010756988 | $3.767793*10^{-5}$ |
| 6 | -0.069566814 | 0.043084659 | -0.014244309 | 0.0056746439 | -0.0023477992 | 0.00045561285 | -0.0001303005 |
| 7 | -0.031170577 | 0.012502222 | -0.0015560529 | 0.0004022829 | -0.00052405951 | 0.0007339521 | -0.00018491291 |
| 8 | 0.019598618 | 0.0020290224 | 0.009559616 | -0.00043808027 | 0.00211103932 | -0.0048994534 | 0.0033691349 |
| 9 | -0.26518792 | -0.0026962765 | -0.014793179 | 0.037566748 | -0.036296528 | 0.00043627275 | 0.0031185942 |
| 10 | -0.2437951 | 0.062894339 | -0.0085920324 | -0.001849785 | -0.00012748349 | 0.00046213886 | $-9.4362838*10^{-5}$ |

Figure 5

OPTICAL SYSTEM FOR AN IMAGE ACQUISITION DEVICE

CROSS REFERENCE TO RELATED APPLICATIONS

The present application is a Continuation in Part of U.S. patent application Ser. No. 14/821,156, filed on Aug. 7, 2015, the content of which is expressly incorporated by reference herein in its entirety. This application also claims the benefit of U.S. Provisional Patent Applications No. 62/035,272 filed Aug. 8, 2014 and No. 62/126,270 filed Feb. 27, 2015, which are hereby incorporated by reference herein in their entirety.

FIELD

Invention embodiments disclosed herein relate to an optical system for an image acquisition device.

BACKGROUND

A. K. Jain, A. Ross, and S. Prabhakar, "An introduction to biometric recognition," IEEE Trans. Circuits Syst. Video Technol., vol. 14, 2004 discloses that the iris of the eye is a near-ideal biometric. Typically an image of an iris is best acquired in a dedicated imaging system that uses infra-red (IR) illumination, typically near infra-red (NIR) in the range 700-900 nm, and the eye is aligned with the acquisition camera. Nonetheless, systems supporting the acquisition of iris data from mobile persons are known, for example, as disclosed in J. R. Matey, O. Naroditsky, K. Hanna, R. Kolczynski, D. J. Lolacono, S. Mangru, M. Tinker, T. M. Zappia, and W. Y. Zhao, "Iris on the Move: Acquisition of Images for Iris Recognition in Less Constrained Environments," Proc. IEEE, vol. 94, 2006. This employs specialized lighting and requires people to walk along a specified path where multiple successive iris images are acquired under controlled lighting conditions. The system is proposed for airports where iris information is being used increasingly to verify passenger identity.

Daugman, J. "How Iris Recognition Works", IEEE Transactions on Circuits and Systems for Video Technology, 14(1), 21-30, 2004 discloses that in order to correctly identify an iris, an iris pattern needs to extend across at least 80 pixels of an image. Other studies indicate that an iris pattern might need to extend across up to 200 pixels of an image for reliable iris identification.

For a typical 8 megapixel (Mp) camera with a field of view (FoV) of 70 degrees, assuming a wavelength of 550 nm (near the center of the visible spectrum) and a subject face at a distance of approximately 250 mm, it can be shown that a typical iris of 12 mm diameter would extend across the minimum resolution of 80 pixels and so might meet the required criteria for identification. However, when the same calculation is applied at a NIR wavelength of 900 nm, it can be seen that the resolution is reduced to about 50 pixels. So while a typical image sensor of 8 Mp might resolve an iris at visible wavelength, the sensor would not be optimal at NIR wavelengths.

These calculations suggest that implementing iris recognition in a consumer device would require either a movable NIR filter to be added to an imaging system which is optimized for both visible and NIR image capture, or alternatively a dedicated imaging system for iris-image acquisition to be provided. Clearly, these solutions would add to the cost of such a device, making implementation prohibitive, especially in consumer devices.

As will be understood, the acquisition challenges to implementing iris imaging, especially for the purposes of identification, on consumer devices such as smartphones, include that: (i) the iris is a relatively small target located on a wet, curved and reflecting surface; (ii) occlusions occur due to eyelids and eye-lashes; (iii) specular reflections block portions of the iris pattern; (iv) the iris pattern is most responsive to NIR illumination; (v) visible light can distort the fundamental iris pattern, especially in a dark pigmented iris; and (vi) image acquisition requires high user cooperation etc.

The prior art includes U.S. Pat. No. 6,870,690 which describes a single optical system used to image two different optical bands, for example visible and infrared, with the same possible adjustments in zoom and/or focus. A dual band singlet is formed of a first, larger, optical element, suitable for operating on light of a first optical band, with an aperture cut out of it. A smaller element, suitable for operating on light of a second optical band, is secured in, or on either side of, the aperture cut through the larger optical element, thus forming a dual band singlet that can operate on two different wavelength bands. Combinations of dual band lenses, lens elements, and lenses with cut-out apertures are used to form dual-band optical systems, including systems with dual-band focus and zoom.

U.S. Pat. No. 8,059,344 describes an optical lens system that focuses both a first band of wavelengths and a second band of wavelengths onto a common focal plane. The system uses lens segmentation where a second region made of a second material is different from a first material, and is shaped to partially focus the second band of wavelengths onto the focal plane.

Each of U.S. Pat. No. 6,870,690 and U.S. Pat. No. 8,059,344 are similar in that they involve an annular shaped outer lens region designed to focus a first set of wavelengths and an inner lens region designed to focus a second set of wavelengths. Such a two-component structure involves complex manufacture and assembly and so would be prohibitively expensive to include in consumer electronic devices. It should also be noted that in U.S. Pat. No. 8,059,344, the inner lens does not transmit the wavelength of the outer region so there is a blind spot at the center of the lens.

U.S. Pat. No. 7,881,603 describes a dichroic filter for use with an electronic imaging device, such as a camera. The dichroic filter is located in the main imaging lens, and may permit all light to pass through a first portion and be measured by a photosensor, while restricting at least some portions of visible light from passing through a second portion thereof. In this manner, only the non-restricted portions of visible light passing through the second portion may be measured by the associated pixels of the photosensor.

US 2010/0066854 describes a camera comprising an imaging system having a first depth of field for one or more first colours and a second depth of field, smaller than the first depth of field, for one or more second colours. The imaging system may comprise an iris with a first aperture for the first colour or colours and a second aperture, which is larger than the first, for the second colour or colours. The first aperture may be defined by an outer opaque ring (1) and the second by an inner chromatic ring (2). The inner ring (2) blocks the first colour(s) and passes the second colour(s). The image formed of the first colour(s) is sharper and its sharpness may be transposed by image processing to the other images. Each of U.S. Pat. No. 7,881,603 and US 2010/0066854 however are only concerned with processing visible wavelengths.

In U.S. Pat. No. 8,294,808, a dual field-of-view optical imaging system is provided for obtaining two images of a scene, each image having a different field of view. The dual field-of-view optical imaging system includes a frontal dual focus lens, the dual focus lens having a central zone of focal length f1 producing a wide field-of-view image at a first focal plane and a peripheral zone of focal length f2 greater than f1 producing a narrow field-of-view image at a second focal plane; and a detector for detecting and acquiring the wide field-of-view image and the narrow field-of-view image, the detector being movable along an optical path for selective positioning at the first focal plane or the second focal plane.

US 2013/0033579 discloses processing multi-aperture image data including (i) capturing image data associated of one or more objects by simultaneously exposing an image sensor in an imaging system to spectral energy associated with at least a first part of the electromagnetic spectrum using at least a first aperture, and (ii) to spectral energy associated with at least a second part of the electromagnetic spectrum using at least a second aperture; (iii) generating first image data associated with said first part of the electromagnetic spectrum and second image data associated with said second part of the electro-magnetic spectrum; and, (iv) generating depth information associated with said captured image on the basis of first sharpness information in at least one area of said first image data and second sharpness information in at least one area of said second image data.

US 2013/0113988 discloses forming an image of a scene including capturing an image of the scene by exposing an image sensor to radiation from one part of the EM spectrum using one aperture and to radiation from another part of the EM spectrum using another aperture having a different size than the first aperture. Simultaneously with capturing the image, the scene is illuminated with radiation from the second part of the EM spectrum. The image is then formed on the basis of image data generated by the radiation from the first part of the EM spectrum and image data generated by radiation from the second part of the EM spectrum.

Each of U.S. Pat. No. 8,294,808, US 2013/0033579 and US 2013/0113988 requires that the two different regions of the electromagnetic spectrum are focused to different depths.

US 2012/0242857 discloses a system for increasing depth of field in camera lenses, relying on half aperture filtering. The imaging system has an aperture with a first region arranged to pass at least optical radiation in the first frequency band and substantially block optical radiation in the second frequency band and a second region arranged to pass at least optical radiation in the second frequency band, the first region having its center non-overlapping a center of the second region.

US2011/205651 discloses a photodynamic diagnosis or therapy system including an aperture stop including a filter area formed on a flat-plate substrate, and a variable aperture area formed inside the filter area. The filter area transmits infrared light and reduces or blocks the transmission of visible light. The aperture area transmits light in the wavelength range corresponding to fluorescent light from an observed area of a subject and light in the wavelength range corresponding to illumination light to the subject. The system makes it possible to simultaneously observe a subject image formed by illumination light in the visible light band and an observed image formed by weak fluorescent light from the observed area of the subject in the infrared light band.

SUMMARY

According to the present invention, there is provided a smartphone for performing biometric recognition of a subject according to claim 1.

Embodiments disclosed herein provide a smartphone capable of imaging both visible and near-infrared images on a single sensor with a simple-to-produce lens assembly.

Embodiments of the invention provide an optical system for focusing both visible and near-infrared (NIR) spectral regions onto a multi-wavelength sensor, the NIR radiation having a larger aperture and narrower field-of-view than the visible light aperture.

Embodiments of the invention enable two images of a scene to be substantially simultaneously obtained at a single or common (focus) focal surface.

At object distances of concern for acquiring images for the purposes of iris recognition, typically in the region of 200 mm-250 mm, the optical system can produce images at the visible wavelengths over a field of view comparable to that of a NIR band, including providing a spatial resolution of NIR sensing pixels similar (or if required, even higher) to the spatial resolution of the visible light sensing pixels.

Using such embodiments of the present invention, a typical consumer camera can acquire NIR images of a scene including a face having an iris pattern extending sufficiently to enable biometric identification to be performed even for example when a Color Filter Array (CFA) type sensor is being employed (where the NIR image is sensed on comparatively fewer pixels than the visible image).

In embodiments, the optical system comprises a front collecting lens with a filter that allows NIR radiation to pass. The full area of the collecting lens gathers NIR radiation with a large aperture (low F-number). The filter includes a central aperture so that visible wavelengths can only pass through the central region and are gathered with a smaller aperture (higher F-number). The collecting lens and the other elements of the lens assembly are designed so that the NIR radiation is obtained from a narrower FoV, for example, 20 degrees of arc, than the visible, for example, 60-65 degrees of arc, both being focused on the same focal surface and the resulting images being acquired by a multi-wavelength sensor, such as a modified CFA type sensor.

Embodiments of the present invention provide a smartphone including a lens assembly which can be fabricated using a plastics molding process while providing sufficient optical quality to enable both visible and infra-red images of a scene to be acquired.

Embodiments of the present invention use a piece for each molded optical component of the lens assembly with each lens component comprising a single material.

So while each lens element is rotationally symmetric and homogeneous, it will be appreciated that in some applications, a lens with a gradient index along the optical axis might be employed according to application requirements.

BRIEF DESCRIPTION OF THE DRAWINGS

Embodiments of the invention will now be described, by way of example, with reference to the accompanying drawings, in which like reference numerals refer to corresponding features throughout the figures:

FIG. 3 summarizes optical characteristics of the optical system of FIG. 2;

FIG. 4 illustrates an exemplary set of material coefficients and measurements of the elements of the optical system of FIG. 2;

FIG. 5 illustrates an exemplary set of aspheric coefficients for the lens elements of the optical system of FIG. 2;

DESCRIPTION OF THE PREFERRED EMBODIMENT

Figure 1:
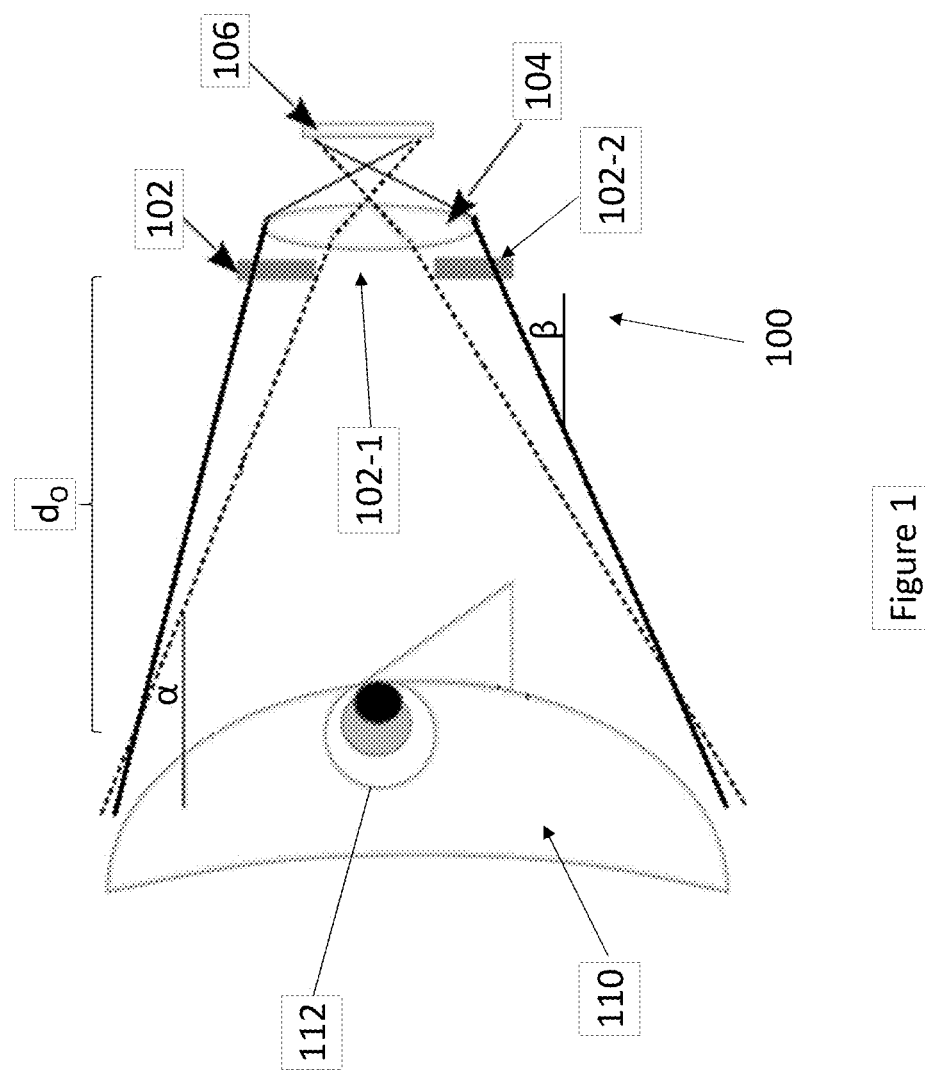
FIG. 1 shows schematically an optical system for an image acquisition device according to an embodiment.

Referring now to FIG. 1, there is shown schematically an optical system 100 for an image acquisition device according to an embodiment of the present invention.

The optical system 100 comprises a filter 102, a lens assembly 104 and an image sensor 106. In FIG. 1, a face 110 including a pair of eyes 112 (only one shown) is located at an object distance $d_O$ from the image acquisition device including the optical system 100. (As will be appreciated from the disclosure below, FIG. 1 is not to scale.)

In the embodiment, the filter 102 is incorporated in a front protective window providing spectral filtering in which visible light is transmitted through a central zone only, and IR light is transmitted across the complete optical aperture.

The filter 102 includes a central aperture 102-1 which transmits both visible and near-infrared wavelengths. The filter 102 also includes a peripheral region 102-2, which blocks visible wavelengths including wavelengths from 500 nm to 600 nm and passes infrared wavelengths, typically those greater than 800 nm. The peripheral region 102-2 may have an annular shape. In embodiments, the outside peripheral diameter is chosen to be between about 1.5 and 1.6 times the inner diameter. In embodiments, the ratio between the outside peripheral diameter and the inner diameter may be substantially the same as the ratio between an infra-red wavelength of interest and a visible wavelength of interest.

An example of an image sensor 106 which can be employed in some embodiments of the invention is an RGBW type sensor from Kodak, often referred to as a Color Filter Array (CFA). Pixels in a CFA are typically arranged as follows:

WBWG . . .
BWGW . . .
WGWR . . .
RWRW . . .

Pixels labelled W, R, G, B above are sensitive to visible (as well as IR), red, green and blue light respectively. Note that in their raw form, silicon pixel elements of CMOS sensors are sensitive across the visible spectrum and into the NIR spectral range to wavelengths of 1000 nm and above. Thus, by default white pixels in a sensor array are sensitive to IR wavelengths. Also, note that NIR light is sensed on comparatively fewer pixels than visible light.

In the embodiment, the sensor 106 has a diagonal extending approximately 5.2 mm, typical for smartphone cameras, although it will be appreciated that sensor size and pixel density can vary according to application requirements.

In a first approach, the 'white' pixels of an RGBW type sensor can be coated with an optical bandpass filter, so that they are only sensitive to a narrow band of IR wavelengths, for example around 850 nm.

In a second approach, the 'white' pixels remain untreated and thus sensitive to visible wavelengths as well as NIR. As well as allowing NIR enhanced image acquisition described in more detail below, this approach can use the additional visible illumination information of the white pixels to allow the data from the 'white' pixels to provide input for enhancing conventional visible images acquired from the RGB pixels, as described in U.S. Pat. No. 8,264,576, assigned to the same applicant. However, the quality of iris pattern extracted from such white pixels would tend to be less detailed and reliable than from embodiments employing the first approach.

Figure 2:
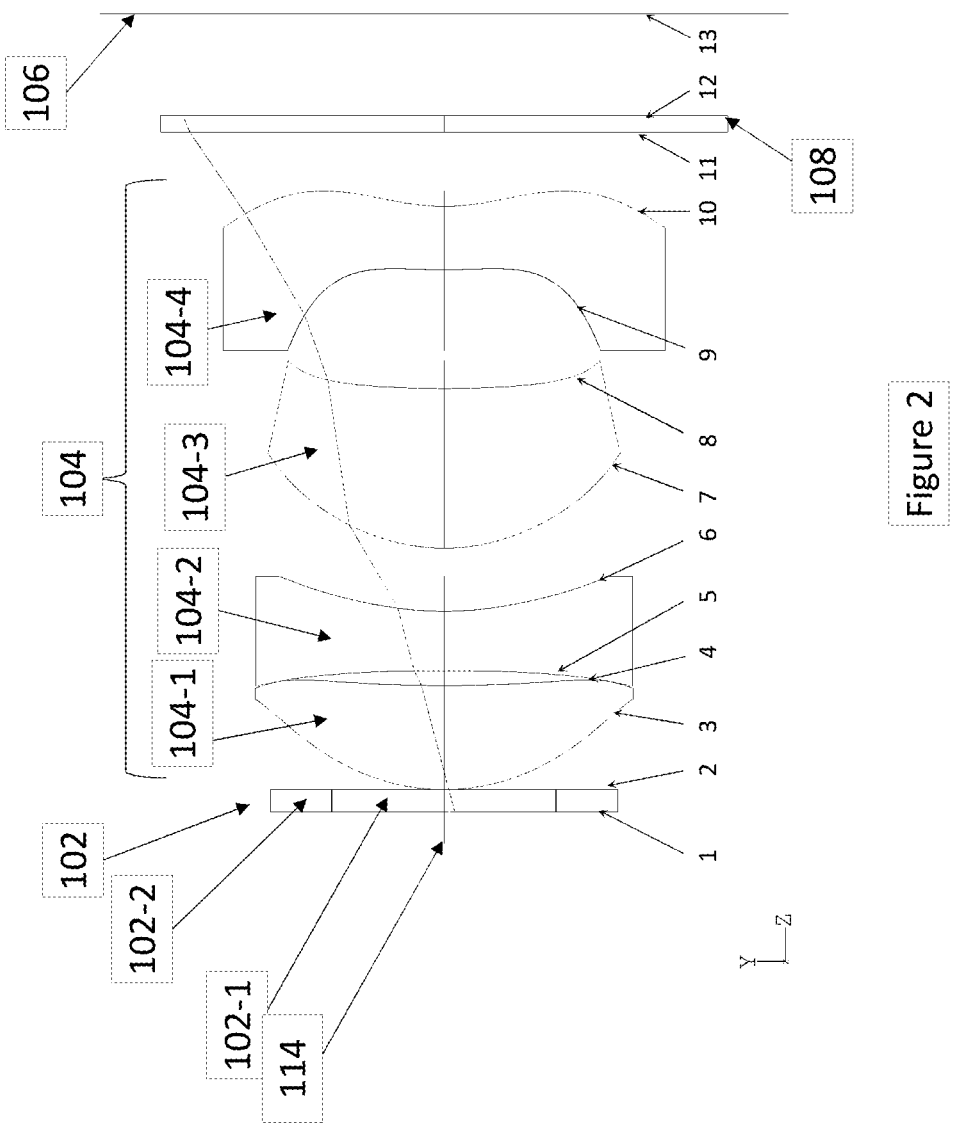
FIG. 2 shows in more detail an optical system according to an embodiment.

In a third approach, illustrated in FIG. 2, a separate filter 108, is interposed between the lens assembly 104 and the sensor 106. The filter is designed to pass RGB light in the range 400 nm to 650 nm as well as IR light in a narrowband centred in the region of 850 nm. Thus, the filter blocks light in the NIR band between 850 nm and the visible wavelengths, so avoiding leakage and interference caused by the discontinuity in the filter 102.

In a still further approach, the sensor 106 comprises a conventional RGB or RGBW type sensor where each of the RGB pixels have a naturally occurring limited NIR sensitivity. (In some implementations, the sensor may be specially sensitized to increase IR sensitivity.)

Figure 7:
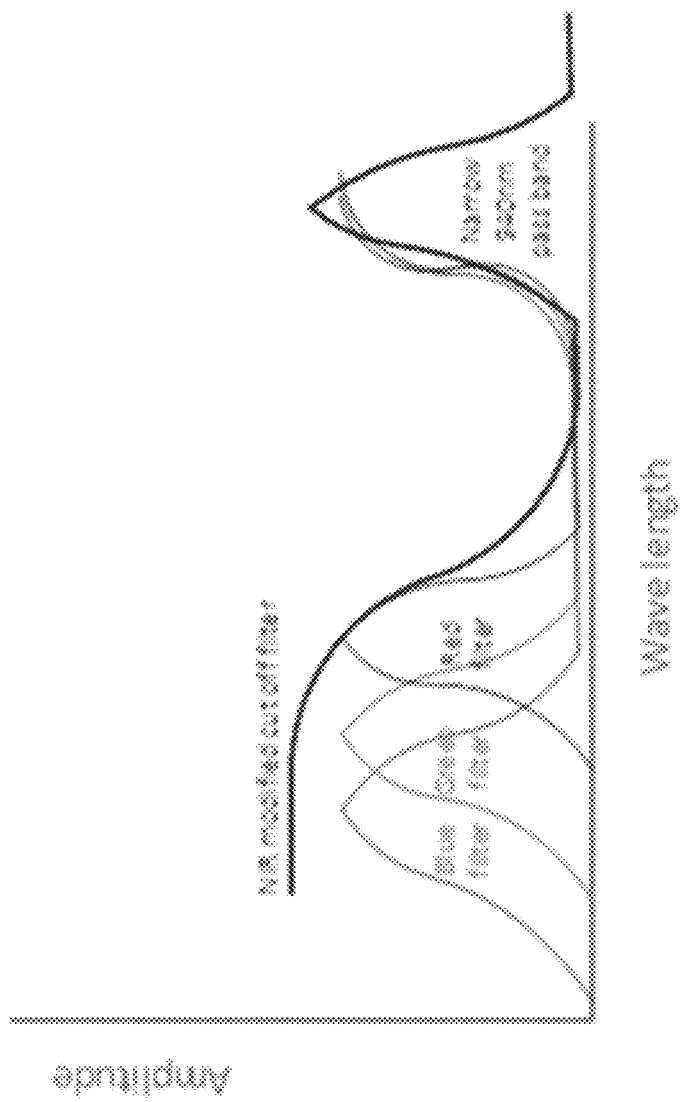
FIG. 7 illustrates a transfer function of a filter for use in an embodiment of the invention.

As in FIG. 2, a filter 108 is placed in the light path in front of the sensor 106. As shown in FIG. 7, the filter 108 has a visible pass band and a narrow pass band of about 20 nm around 940 nm. A passband centered about 850 nm could also be used, but centering about 940 nm minimizes leakage into RGB band.

Note that in variants of the optical parameters for the lens assembly 104 provided in FIG. 3, by choosing f=5 mm, F/2 and an IR wavelength=850 nm, an image containing an iris pattern suitable for recognition could be acquired at distances up to around 400 mm. Alternatively, choosing f=4 mm, F/2 and an IR wavelength=940 nm, would enable images containing an iris pattern suitable for recognition to be acquired at distances up to around 310 mm.

Figure 6:
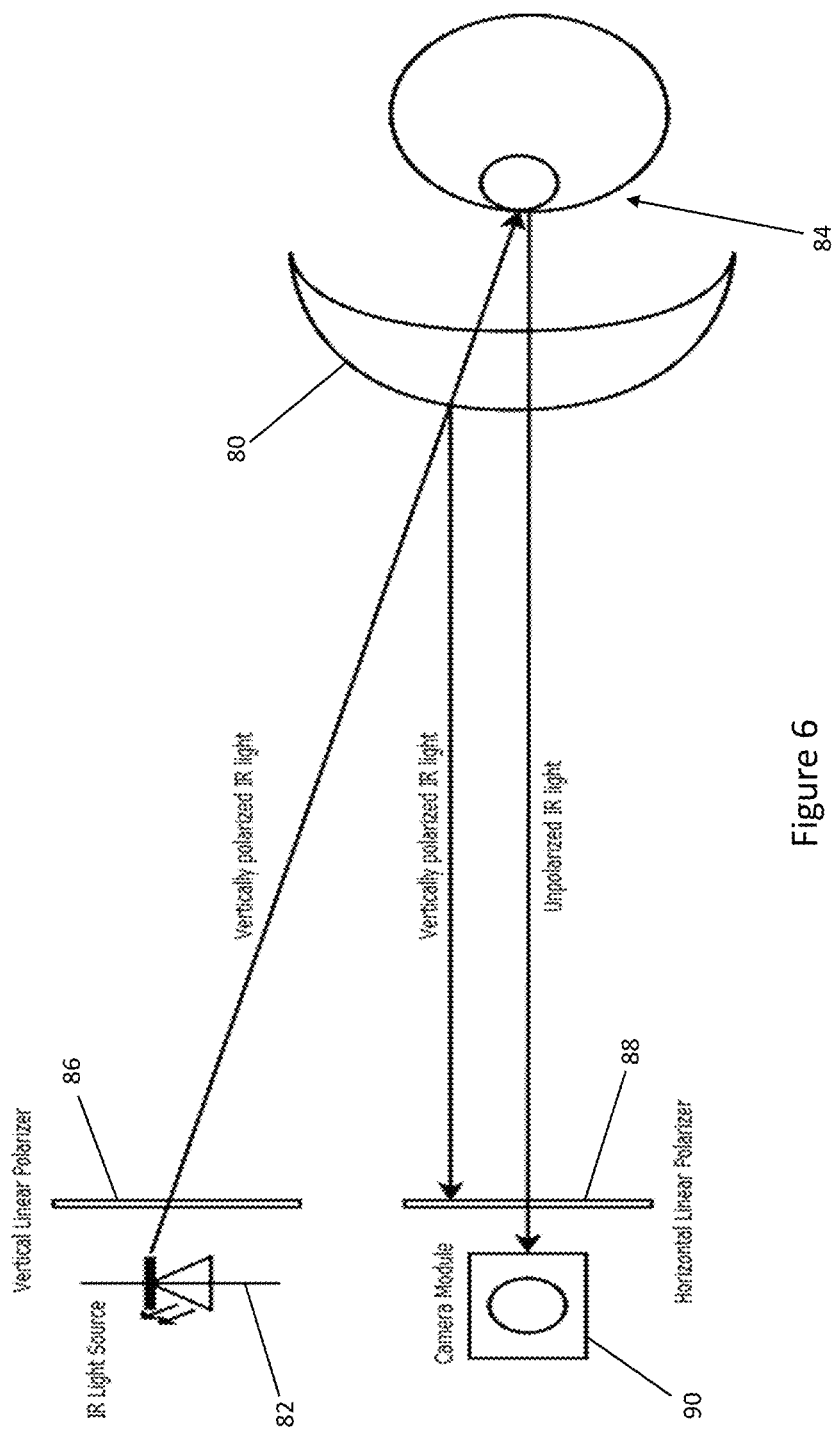
FIG. 6 illustrates an embodiment of the present invention including polarizers to mitigate problems with glare from glasses occluding an image of an iris.

In any case, when capturing a NIR iris pattern image, a narrow band IR light source such as the flash 82 shown in FIG. 6 is employed to illuminate the subject. A short exposure time can be used when capturing an IR iris image for such an illuminated subject, whereas a normal exposure time can be employed when capturing visible images whether illuminated by a convention "white" flash or not.

In such an embodiment, the lens optics 104 can be MEMS or VCM mounted and so can be auto-focused to capture subjects at longer object distances than around 200-400 mm which are of interest for biometric recognition.

In each of the approaches, an image acquisition device incorporating the optical system 100 can also include a NIR LED (not shown), or equivalent wavelength specific source of illumination can be used to emphasize the NIR response of the white pixels.

Also, in each of the above cases the NIR sensitive pixels are 'clocked' independently of the RGB pixels so that an image acquisition device processing pipeline (not shown) connected to the sensor can acquire visible and NIR images independently of each other. It will be appreciated that with the optical system 100, IR light is collected from a larger collecting area, typically 2.25-2.7 times, than visible light—this helps to reduce the exposure time for imaging an iris using IR light. Again, using an NIR flash for iris imaging helps to reduce the exposure time even further, so minimizing any possible image blur due to object motion.

Referring again to FIG. 2, in some embodiments of the present invention a 4-lens assembly 104 is employed. Nonetheless, it will be appreciated that in variants of the embodiment, fewer or more lens elements could be employed, the former limiting image quality with the latter potentially improving quality, albeit at higher cost.

The lens elements comprise an aperture group including a positive front collecting lens 104-1 disposed immediately adjacent the filter 102. In the embodiment shown, lens 104-1 includes a meniscus shape in a central portion of the lens 104-1 nearest the optical axis 114, with the object side surface (Surface 3) being convex. Further, surface 4 of lens 104-1 is an aspheric surface characterized by an aspheric inflection point. In the central region of lens 104-1, surface 4 is concave. Accordingly, surface 4 curves toward the image side (toward sensor 106) with increasing radius from optical axis 114. However, with a further increasing radius from optical axis 114 towards the periphery of lens 104-1, surface 4 changes direction and bends toward an object side (away from sensor 106), thus forming an aspheric inflection point.

In the illustrated embodiment, the filter 102 is shown as a separate planar element to the lens assembly 104. However, in variations of the invention the filter, including the aperture stops for the visible and IR imaging systems, can be provided as a coating on the front surface (Surface 3) of the collecting lens 104-1.

A negative lens 104-2 paired with the collecting lens 104-1 is disposed adjacent the lens 104-1 opposite the filter 102. In the embodiment shown, lens 104-2 includes a bi-concave shape with both surfaces (Surface 5 and Surface 6) being aspheric.

Lenses 104-3 and 104-4 located between the aperture group 104-1, 104-2 and the sensor 106 act as field flatteners with the lens assembly 104 as a whole providing achromatized visible and narrowband IR images free from optical aberrations. In the embodiment shown, lens 104-3 includes a meniscus shape, with the object side surface (Surface 7) being convex and with both surfaces (Surface 7 and Surface 8) being aspheric. In the embodiment shown, lens 104-4 includes a meniscus shape in a central portion of the lens 104-4 nearest the optical axis 114, with the object side surface (Surface 9) being convex near the optical axis 114. Further, the object side (Surface 9) and image side (Surface 10) of lens 104-4 are aspheric surfaces characterized by aspheric inflection points.

In the embodiment shown, each of the lenses of the assembly 104 are made from material transparent to visible and NIR wavelengths and do not require lens segmentation. For example, the lenses do not include annular inserts of different material and aside from any aspheric inflections, the lens surfaces have no discontinuity between their centre and their periphery.

As mentioned above, the filter element 108 is disposed between the lens assembly 104 and the sensor element 106.

As will be appreciated from the characteristics calculated below, the optical requirements for the lenses 104-1 to 104-4 allow the lenses to be fabricated as unitary components from conventional type molded plastics suitable for optical applications. As such, apart from the addition of the filter 102 and possibly the filter 108, the optical system can be produced for similar costs to conventional optical systems, typically used in smartphone cameras and using similar production methods.

In one embodiment of the invention, the filter 102 is chosen to have an inner aperture 102-1 diameter $D_{VIS}=1.70$ mm and an outer aperture diameter, 1.6 times larger, $D_{IR}=2.72$ mm.

This diameter ratio is chosen as approximately the ratio of the central NIR wavelength of concern $\lambda_{IR}=860$ nm over the central wavelength of the visible spectrum $\lambda_{VIS}=540$ nm. In the present embodiment, the inner aperture 102-1 is the primary aperture stop for the visible imaging function of lens assembly 104 and the outer perimeter of the peripheral region 102-2 of filter 102 is the aperture stop for the NIR imaging function of lens assembly 104.

The focal length for both modes (visible and IR) is chosen as $f_{VIS} \cong f_{IR} \cong 4.65$ mm so that the optical system can fit within a typical smartphone housing.

With the sensor 106 extending 5.2 mm diagonally and a focal length of f=4.65, the lateral magnification for an object at a distance $d_O=200$ mm is equal to $m=d_O/f=43$ times. This enables an image of a face to be captured by an image acquisition device including the optical system 100 for the purpose of reading biometrics both based on visible facial features and IR features including an iris pattern.

Where the optical system is incorporated in a handheld device such as a mobile phone, the image can be acquired as a "selfie", taken by a user wishing to identify themselves for the purposes of identification and authentication to an application running on the device; or indeed a remote application communication with the device.

Where the optical system is provided to enable users to identify or authenticate themselves by way of a selfie, it will be appreciated that the iris portions will likely only occupy a limited central region of the NIR image. In some embodiments, where peripheral regions of the NIR image are not of interest and as NIR light at the peripheral regions may adversely interfere with the visible image, either the peripheral regions of the sensor 106 or the filter 108 could be provided with an additional annular IR filter layer, to cut-off IR from the sensor periphery and give an effective NIR field of view of say 10-20 degrees relative to a visible field of view of about 60 degrees.

Since the focal length for the different wavelength modes is approximately equal $f_{VIS} \cong f_{IR}$, and the ratio $\lambda/D$ (where $\lambda$ is the wavelength of light and D is the aperture stop diameter) is approximately equal for both visible and IR wavelengths, the optical system provides the same diffraction limited spatial resolution, which can be expressed as the radius of the Airy disk defined by equation (1) below, of 1.83 µm at the sensor 106 for both visible and IR wavelengths.

$$R_{Airy}=1.22\lambda f/D \quad (1)$$

The inner aperture 102-1 of the filter 102, lens system 104, filter 108 and sensor 106 provide a standard type camera optical system working at F-number=$f_{VIS}/D_{VIS}$=f/2.73 over a 60 degree field of view ($\alpha$*2 in FIG. 1). The wider aperture provided by filter portions 102-1 and 102-2 extends the optical diameters of the first two lenses 104-1 and 104-2, to provide a faster F-number=$f_{IR}/D_{IR}$=f/1.76 NIR imaging system (mode) albeit with a narrower field of view, typically 20 degrees ($\beta$*2 in FIG. 1).

The annular outer zones of the aperture group lens 104-1, 104-2 and indeed the lenses 104-3 and 104-4 enable the optimizing of focus position for visible and IR images formed simultaneously on the sensor 106. This is achieved by shaping the lenses at the annular outer zone so that spherical aberration reduces the axial colour effect.

FIG. 3 summarizes optical characteristics and requirements for the optical system outlined above.

FIG. 4 illustrates the optical parameters for the elements 104-1 through 104-4 of the optical system 104 of FIG. 2 (units for radii, thicknesses and diameters are mm) calculated for the requirements of FIG. 3. The left-most column refers to the surfaces labelled 1-13 in FIG. 2.

As will be seen from the refractive index and dispersion (Abbe Number) requirements for each of the lens elements 104-1 to 104-4, materials, particularly plastics materials satisfying these requirements are readily available. Some exemplary plastic, optical grade materials include PMMA (methyl methacrylate resin), PC (Polycarbonate resin), and COP (cyclo-olefin polymer). Some exemplary providers of optical grade plastic materials for imaging lenses include Osaka Gas Chemicals and Mitsui Chemicals, Inc. N-BK7, indicated as a suitable substrate material for each of the filters 102 and 108, is an optical glass available from SCHOTT North America, Inc.

The curvature of the surfaces of the lens elements 104 are defined by high-order aspheric coefficients. An even asphere with a vertex radius of curvature R, conic constant k and the sag z at the height h is described by the formula (2) below:

$$z = \frac{h^2}{R + \sqrt{R^2 - (k+1)r^2}} + A_1 h^4 + A_2 h^6 + A_3 h^8 + A_4 h^{10} + A_5 h^{12} + A_6 h^{14} + A_7 h^{16} \quad (2)$$

FIG. 5 shows exemplary asphere coefficient values calculated for each of the surfaces labelled 4-10 in FIG. 2.

It will be appreciated that the specific lens arrangement illustrated in FIG. 2 as well as the characteristics for the lenses illustrated in FIGS. 3-5 are for exemplary purposes only and the invention is not to be regarded as being limited to any particular one of these values.

Similar characteristics could be determined for lens assemblies including differing numbers of lens elements; or indeed variants of the above characteristics for a 4 lens assembly could be employed. For example, different lens materials having a different refractive index and/or Abbe number may be used, yielding different lens surface shapes.

Summarizing the above disclosure, visible light passes through a central circular zone of an aperture, while NIR light, particularly between the 800 nm to 900 nm wavelengths passes through the whole unobstructed aperture. Both images are focused on the same sensor simultaneously with similar magnification at specified focal lengths and object distances of concern.

The circular aperture has no central obscuration, which keeps modulation transfer function (MTF) curves at a high or nearly perfect level, especially for the central part of the field.

Wavelength filtering can also take place at the image sensor, particularly where residual IR light (outside the NIR band if interest) is not desired. Nonetheless, the sensor can still act as a normal sensor for visible wavelengths.

NIR imaging is done through the whole aperture with no central obscuration over a relatively narrow field, typically about 20 degrees.

There is no strict separation between visible and NIR imaging modes; in the central zone of the aperture, the visible and NIR light paths overlap.

The lens surfaces have no discontinuity when going from the centre to the outer zone.

The optical system provides sharp images in the visible and NIR bands simultaneously—bearing in mind that the NIR image is clocked independently of the visible image and so one image can be read from the image sensor at a fractionally different time than the other.

The image position in the visible and NIR coincide to prevent axial colour defocus.

The image magnification in the visible and NIR are substantially similar at specified focal lengths and object distances of concern, in this case about 200-250 mm, to provide easy iris registration. Thus, for example, face recognition software that may be tracking a subject's facial features in a stream of visible wavelength images can be used to locate an iris pattern within an acquired NIR image of the same scene (or vice versa).

Because of the larger aperture diameter for NIR imaging, spatial image resolution in the visible and NIR is similar at the specified focal lengths.

The optical system thus allows simultaneous imaging of objects in the visible and near infrared bands on a single sensor with constant angular magnification and invariant spatial resolution.

While the illustrated embodiments have been described in terms of a planar image sensor, it will be seen that variants of these embodiments could include a curved image sensor with a non-planar sensor surface on which visible and NIR images are simultaneously focussed.

The optical system has been described above in terms of a lens for a smartphone type camera and these are typically integrated with such devices.

Referring now to FIG. 6, it will be appreciated that a common application for the optical systems described above is for acquiring IR images for use in iris based identification, typically to authenticate a user of a device. However, in many cases such users can be wearing glasses 80 which strongly reflect IR light. Thus, where an IR light source 82 is employed to illuminate a subject, the resultant glare from their glasses can completely occlude the subject's iris 84.

In some embodiments of the present invention, a set of linear polarizers 86, 88 are mounted in front of each of the IR light source 82 and an acquisition device camera module 90 including an optical system such as described in relation to FIGS. 1-5 above. The angle between the polarization axis of the polarizer 86 mounted onto the IR light source 82 and the polarizer 88 mounted onto the camera module 90 is 90 degrees. Thus in one implementation based on an acquisition device in a conventional orientation, the first polarizer 86 would vertically polarize light, while the second polarizer 88 would horizontally polarize light.

This way, as long as light from the IR source 82 reflected by the glasses 80 does not change its polarization axis, the light reflected by the glasses which is vertically polarized is filtered out by the horizontal linear polarizer 88 mounted onto the camera module 90. However, the light reflected by the eye, including the iris pattern 84, and skin which is un-polarized passes the horizontal linear polarizer 88 mounted onto the camera module 90 and so the iris pattern 84 can be imaged by the optical system.

An alternative to linear polarizers would be to use circular polarizers. In this case a polariser mounted in front of the IR source 82 would have one sense, while a polariser mounted in front of the camera module 90 would have an opposite sense. With the help of circular polarizers, IR reflections from surfaces could be removed, and they could also help improve the quality of the images acquired in natural light. So, if instead of the IR light source 82, a natural light source were being used, any polarizer mounted in front of the camera module 90 could be rotated electromechanically in order to achieve good quality images. It is nonetheless appreciated that providing such a rotation mechanism would increase the manufacturing costs for such a camera module.

For any of the above described embodiments, instead of moving either the lens 104 or sensor 106 to accommodate a user not facing the camera at a distance from the lens where their eye regions will be in focus, a software application can be provided which requests the user to move the device (in response to on-screen feedback) to the correct focal distance. (In such embodiments, the camera is disposed on the same surface of the acquisition device as a display screen.) Thus, either contrast or high frequency DCT coefficient information can be captured from an image stream to enable the application to determine when a user's face is at an optimal distance from the device and before an image on which iris recognition is to be based is captured.

The invention claimed is:

1. A smartphone for performing biometric recognition of a subject, the smartphone including an optical system comprising:
   a filter comprising a central aperture of a first diameter arranged to transmit both visible wavelengths and selected near infra-red (NIR) wavelengths and a peripheral aperture of a second given diameter arranged to block visible wavelengths and to transmit said NIR wavelengths, wherein a diameter ratio between the second given diameter of said peripheral aperture and the first diameter of said central aperture is between about 1.5:1 to about 1.6:1;
   an image sensor comprising an array of pixels including pixels sensitive to visible wavelengths and corresponding pixels sensitive to said NIR wavelengths; and
   a lens assembly axially located between said filter and said image sensor and comprising a plurality of lens elements with a focal length shallow enough that the optical system can fit within the smartphone, said plurality of lens elements being arranged to simultaneously focus NIR light, received from a given object distance through the central aperture of said filter and the peripheral aperture of said filter, and visible light, received from said given object distance through only said central aperture of said filter, on said image sensor with sufficient spatial resolution such that NIR features including a subject's iris pattern are registered with corresponding visible facial features of the subject.

2. A smartphone according to claim 1 wherein the second given diameter of said peripheral aperture is approximately 2.72 mm to render the optical system applicable for said NIR wavelengths of approximately f/1.76.

3. A smartphone according to claim 1 wherein the first diameter of said central aperture is approximately 1.70 mm to render the optical system applicable for visible wavelengths of approximately f/2.73.

4. A smartphone according to claim 1 wherein said focal length of said lens assembly is between approximately 4 mm and 5 mm and is preferably 4.65 mm and said given object distance is between approximately 200 mm and 400 mm and is preferably between 200 mm and 250 mm.

5. A smartphone according to claim 1 wherein said lens assembly comprises molded plastic lens elements.

6. A smartphone according to claim 1 wherein said lens assembly comprises 4 lens elements.

7. A smartphone according to claim 1 wherein one or more of said plurality of lens elements are aspheric.

8. A smartphone according to claim 1 wherein a pair of lens elements are located axially adjacent said filter, said lens elements in the pair of lens elements comprising respective materials and having optical surfaces suitable for correcting optical aberrations in said NIR wavelengths received through said central and said peripheral aperture.

9. A smartphone according to claim 8, wherein said optical surfaces of said pair of lens elements are suitable for correcting optical aberrations in visible wavelengths received through said central aperture.

10. A smartphone according to claim 1 wherein said filter is provided as a discrete planar element spaced from a front lens of said lens assembly.

11. A smartphone according to claim 1 wherein said filter is provided on a surface of a front lens of said lens assembly.

12. A smartphone according to claim 1 wherein said image sensor comprises a Color Filter Array (CFA) type sensor comprising discrete pixels sensitive to red, green and blue wavelengths as well as corresponding pixels sensitive to said NIR wavelengths.

13. A smartphone according to claim 12 wherein said pixels sensitive to said NIR wavelengths are also sensitive to visible wavelengths.

14. A smartphone according to claim 12 further comprising a planar filter axially located between said lens assembly and said image sensor, said planar filter selectively transmitting only visible wavelengths and said NIR wavelengths.

15. A smartphone according to claim 12 wherein said pixels sensitive to said NIR wavelengths are only sensitive to said NIR wavelengths.

16. A smartphone according to claim 1 wherein said NIR wavelengths are between approximately 800 nm and 940 nm and preferably approximately 850 nm wavelengths.

17. A smartphone according to claim 1 comprising an IR filter axially located between said lens assembly and said image sensor for cutting off IR light from a peripheral region of said image sensor.

18. A smartphone according to claim 1 further comprising a NIR light source to illuminate a subject when said NIR wavelength image is being acquired.

19. A smartphone according to claim 1 further comprising a processor arranged to independently acquire said visible wavelength image and said NIR wavelength image from said image sensor.

20. A smartphone according to claim 1, further including a software application which is operable to determine if an image acquired by said optical system is in focus and, responsive to said image not being in focus, to direct a user to correct a distance between an eye region and the lens assembly.

21. A smartphone according to claim 20 including a first polarizer mounted in front of said NIR light source and a second polarizer mounted in front of said optical system.

22. A smartphone according to claim 21, wherein the first and second polarizers are linear, each having respective polarization axes at 90 degrees to the other.

23. A smartphone according to claim 21, wherein the first and second polarizers are circular, each having opposite polarization senses.

24. A smartphone according to claim 23 wherein one of the polarizers is rotatably adjustable.

25. A smartphone according to claim 1 wherein said image sensor comprises pixels which are sensitive to one of red, green or blue wavelengths, said pixels also being sensitive to said NIR wavelengths, said smartphone operable to selectively acquire a visible wavelength image from said image sensor or a NIR wavelength image from said image sensor, said smartphone further comprising an NIR light source to illuminate a subject when capturing an iris pattern image.

* * * * *